United States Patent
Thiele et al.

(10) Patent No.: US 9,800,297 B2
(45) Date of Patent: Oct. 24, 2017

(54) METHOD AND DEVICE FOR DATA PROCESSING IN A COMMUNICATION NETWORK

(75) Inventors: Lars Thiele, Berlin (DE); Thomas Wirth, Berlin (DE); Thomas Haustein, Potsdam (DE); Volker Jungnickel, Berlin (DE); Malte Schellmann, Munich (DE); Egon Schulz, London (GB); Wolfgang Zirwas, München (DE)

(73) Assignee: Nokia Siemens Networks Oy, Espoo (FI)

( * ) Notice: Subject to any disclaimer, the term of this patent is extended or adjusted under 35 U.S.C. 154(b) by 145 days.

(21) Appl. No.: 13/264,259

(22) PCT Filed: Apr. 14, 2010

(86) PCT No.: PCT/EP2010/054853
§ 371 (c)(1),
(2), (4) Date: Dec. 28, 2011

(87) PCT Pub. No.: WO2010/119044
PCT Pub. Date: Oct. 21, 2010

(65) Prior Publication Data
US 2012/0113897 A1 May 10, 2012

(30) Foreign Application Priority Data
Apr. 14, 2009 (EP) .................................. 09100235

(51) Int. Cl.
*H04L 12/28* (2006.01)
*H04B 7/024* (2017.01)
*H04B 7/0452* (2017.01)
*H04B 7/06* (2006.01)
*H04B 7/04* (2017.01)

(52) U.S. Cl.
CPC .......... *H04B 7/024* (2013.01); *H04B 7/0452* (2013.01); *H04B 7/0465* (2013.01); *H04B 7/0626* (2013.01)

(58) Field of Classification Search
None
See application file for complete search history.

(56) References Cited

U.S. PATENT DOCUMENTS

| | | | | |
|---|---|---|---|---|
| 8,254,318 B2* | 8/2012 | Monogioudis | ...... | H04W 72/046 370/329 |
| 8,626,104 B2* | 1/2014 | Huang et al. | ................. | 455/310 |
| 8,780,830 B2* | 7/2014 | Doppler et al. | .............. | 370/329 |
| 8,781,402 B2* | 7/2014 | Haustein | ................ | H04B 7/022 455/226.1 |

(Continued)

OTHER PUBLICATIONS

Chua, W.S., et al., "Limited Feedback for Multi-Antenna Multi-User Communications with Generalized Multi-Unitary Decomposition", © 2008 IEEE, 5 pgs.

(Continued)

*Primary Examiner* — Christopher T Wyllie
(74) *Attorney, Agent, or Firm* — Harrington & Smith (57) ABSTRACT

A method and a device for data processing in a communication network are provided, wherein a mobile terminal receives several input signals from at least one base station; and wherein the mobile terminal processes said several input signals into a feedback information that is conveyed to at least one base station.

16 Claims, 3 Drawing Sheets

(56) References Cited

U.S. PATENT DOCUMENTS

| | | | |
|---|---|---|---|
| 9,544,913 B2* | 1/2017 | Zirwas | H04B 7/024 |
| 2005/0011365 A1* | 1/2005 | Lamy | H04N 21/234327 |
| | | | 99/326 |
| 2006/0014545 A1* | 1/2006 | Mo et al. | 455/456.1 |
| 2006/0120477 A1* | 6/2006 | Shen et al. | 375/267 |
| 2007/0135166 A1* | 6/2007 | Ding et al. | 455/561 |
| 2007/0248172 A1 | 10/2007 | Mehta et al. | 375/260 |
| 2008/0139153 A1* | 6/2008 | Tuo et al. | 455/277.2 |
| 2008/0318520 A1* | 12/2008 | Kwun et al. | 455/7 |
| 2009/0005102 A1* | 1/2009 | Das | H04W 52/241 |
| | | | 455/522 |
| 2009/0117911 A1* | 5/2009 | Molisch et al. | 455/450 |
| 2009/0175214 A1* | 7/2009 | Sfar et al. | 370/315 |
| 2009/0215480 A1* | 8/2009 | Kim et al. | 455/501 |
| 2009/0225720 A1* | 9/2009 | Molisch et al. | 370/330 |
| 2009/0279478 A1* | 11/2009 | Nagaraj et al. | 370/328 |
| 2010/0002607 A1* | 1/2010 | Kim | H04B 7/024 |
| | | | 370/280 |
| 2010/0009717 A1* | 1/2010 | Monogioudis et al. | 455/562.1 |
| 2010/0046667 A1* | 2/2010 | Tsutsui | 375/296 |
| 2010/0081399 A1* | 4/2010 | Zangi | 455/114.3 |
| 2010/0159972 A1* | 6/2010 | Cho | H04B 7/022 |
| | | | 455/501 |
| 2010/0195759 A1* | 8/2010 | Gaal et al. | 375/295 |
| 2010/0226455 A1* | 9/2010 | Porat | H04B 7/0417 |
| | | | 375/267 |
| 2010/0239036 A1* | 9/2010 | Koo | H04B 7/024 |
| | | | 375/260 |
| 2010/0273495 A1* | 10/2010 | Onggosanusi | H04B 7/024 |
| | | | 455/450 |
| 2010/0329134 A1* | 12/2010 | Doppler | H04L 1/0029 |
| | | | 370/252 |
| 2011/0038436 A1* | 2/2011 | Kim et al. | 375/260 |
| 2012/0021738 A1* | 1/2012 | Koo | H04B 7/024 |
| | | | 455/422.1 |
| 2012/0113897 A1* | 5/2012 | Thiele | H04B 7/024 |
| | | | 370/328 |

OTHER PUBLICATIONS

Hadisusanto, Y., et al., "Distributed Base Station Cooperation via Block-Diagonalization and Dual-Decomposition", © 2008 IEEE, 5 pgs.

Tolli, A, "Resource Management in Cooperative MIMO-OFDM Cellular Systems", © 2008 ACTA Universitatis Ouluensis, 198 pgs.

* cited by examiner

METHOD AND DEVICE FOR DATA PROCESSING IN A COMMUNICATION NETWORK

The invention relates to a method and to a device for data processing in a communication network.

Multiple antenna systems allow for an active exploitation of the spatial degrees of freedom in order to increase the spectral efficiency and to boost throughput in wireless communication systems.

Furthermore, spatial separation of simultaneously transmitted data streams can be performed either at the transmit or at the receive side depending on the available channel state information (CSI) and the capabilities of joint signal processing.

MIMO signal processing on link level utilizes spatial multiplexing or space-division multiple access (SDMA) according to IEEE 802.11n, WiMAX and 3G Long Term Evolution (3G-LTE).

If MIMO capable systems connecting a base station and several mobile terminals are deployed in a cellular environment, interference between cells using the same radio resources becomes a limiting factor. The concept of MIMO signal separation can be applied for active interference management. However, any suppression of interference from adjacent cells is a key issue in cellular mobile communication systems. Hence, if multiple base stations collaborate, the MIMO concept has to be extended to a higher number of antennas involved in the joint signal processing thereby increasing a computational complexity and inflicting challenges regarding distributed channel data collection and coherent signal transmission or reception at antenna locations which may be deployed at a distance of more than 1000 meters.

Methods for collecting CSI from distributed mobile terminals (MTs) usually depend on a transceiver design and on a selection of algorithms.

The problem to be solved is to overcome the disadvantages as mentioned above and in particular to introduce a mechanism that allows for an efficient utilization of feedback information, in particular CSI data, provided by mobile terminals.

This problem is solved according to the features of the independent claims. Further embodiments result from the depending claims.

In order to overcome this problem, a method for data processing in a communication network is provided,
  wherein a mobile terminal receives several input signals from at least one base station; and
  wherein the mobile terminal processes said several input signals into a feedback information that is conveyed to at least one base station.

Hence, said feedback information is a combined (in particular compressed) and therefore reduced information thereby leading to a significant reduction of signaling traffic between the mobile terminal and the at least one base station.

The feedback information provided by the mobile terminal can be used for interference management, in particular for reducing an interference of a collaboration area utilizing joint transmission.

The approach is in particular applicable for several mobile terminals, wherein each mobile terminal may comprise one antenna or several antennas.

It is also an option that the mobile terminal processes feedback information to several base stations, e.g., to two base stations thereby allowing the mobile terminal to maintain two active connections and/or two channels with different base stations. This, however, applies in general for several connections and/or channels.

It is noted that the mobile terminal referred to may be any mobile device with a radio interface, in particular any mobile phone, UE, personal digital assistant, computer or processing unit.

The base station referred to may be any radio station arranged to serve a mobile terminal. The base station may be a NodeB an eNodeB or any access point with a radio interface that can be utilized by the mobile terminal.

The base stations may be connected with one another, e.g., via an X2 interface.

In an embodiment, said feedback information comprises channel state information (CSI).

In another embodiment, the mobile terminal comprises several antennas, utilizing at least one antenna for interference suppression purposes.

For example, beamforming can be utilized via said several antennas of the mobile terminal thereby amplifying the signal and reducing any interference.

In a further embodiment, the feedback information is conveyed to the mobile terminal's serving base station.

In case the mobile terminal has several serving base stations, the feedback information can be provided to each of its serving base stations.

In a next embodiment, the base station distributes the feedback information to at least one further base station and/or to a central unit, wherein the base station and the at least one further base station and/or the central unit aware of the feedback information perform a joint processing, in particular a pre-coder calculation.

Hence, the several base stations performing a joint pre-coder calculation may establish a collaboration area. Such collaboration area can be determined based on the feedback information provided by the mobile terminal (or based on feedback information provided by several mobile terminals). The amount of feedback information fed to the base stations of a collaboration area is significantly reduced due to the processing (e.g., combining) suggested by this approach. Hence, based on the feedback information the base stations of the collaboration area may provide efficient interference processing, e.g., zero forcing or any other type of channel orthogonalization, allowing an improved data processing within the collaboration area at a reduced amount of signaling overhead due to the processed feedback information.

It is also an embodiment that the feedback information comprises at least one of the following:
  a virtual pre-coding conducted by the mobile terminal;
  at least one effective radio channel.

The mobile terminal based on the input signal may conduct a virtual pre-coding and provide such feedback information to it serving base station. The serving base station then becomes aware of an actual pre-coding that would be beneficial for this particular mobile terminal. Hence, the pre-coding provided by the base station can be triggered by the mobile terminal. Also, the base station may consider several such virtual pre-coding suggestions by several mobile terminals to provide a beneficial overall pre-coding.

The at least one base station may have or provide a set of pre-coder (codebook) and the mobile terminal may conduct virtual pre-coding based on such codebook information. Hence, the mobile terminal can choose one pre-coder from the set of pre-coders that complies with its needs best. In particular, the mobile terminal may report its effective radio channel for this selected pre-coder.

Pursuant to another embodiment, the at least one base station has several antennas.

Hence, due to the several antennas of the base station, a beamforming or pre-coding can be achieved, which can be improved based on the feedback information processed at the mobile terminal(s).

According to an embodiment, the input signal is a reference signal conveyed via several antennas of the at least one base station.

According to another embodiment, the at least one base station conducts pre-coding and/or beamforming based on the feedback information obtained by the mobile terminal.

In yet another embodiment, the at least one base station conveys a first type of input signals with a high amount of information infrequently and a second type of input signals with a reduced amount of information frequently.

For example, on a sub-frame basis each 100 ms, the high amount of information can be conveyed towards the mobile terminal(s) and with each frame (10 ms) the reduced amount of information may be conveyed in a pre-coded manner to a particular mobile terminal.

The first type of input signals can be conveyed via all antennas of a base station and the second type of input signals can be conveyed in a beamforming manner utilizing, e.g., only a selection of antennas in a predefined way.

It is also an embodiment, that the feedback information comprises a first type of feedback information with a high amount of information conveyed infrequently and a second type of feedback information with a reduced amount of information conveyed frequently.

Hence, as described above with regard to the first and second type of input signal, the feedback information can be conveyed to the at least one base station in a similar manner. In particular, the first type of feedback information can be conveyed via several antennas of the mobile terminal, whereas the second type of feedback information can be conveyed in a beamforming manner utilizing the mobile terminal's antennas in a predefined way.

According to a next embodiment, at least two base stations are organized as a collaboration area in particular providing a coherent transmission.

Pursuant to yet an embodiment, the base stations of a collaboration area provide distributed processing.

According to a further embodiment, the input signals from the at least one base station are at least partially orthogonal to one another.

It is also an embodiment that the mobile terminal provides the feedback information via a multiple-input single-output channel processing, wherein the mobile terminal in particular selects a receive strategy.

As an option, the mobile terminal may select its receive strategy based on its processing capabilities, in particular independent from other receive strategies of other mobile terminals.

The mobile terminal may also consider external interference that could be determined via at least one of its antennas, and process such information into the combined feedback information to be conveyed to the at least one base station.

The problem stated above is also solved by a device comprising a and/or being associated with a processor unit and/or a hard-wired circuit and/or a logic device that is arranged such that the method as described herein is executable thereon.

According to an embodiment, the device is a communication device, in particular a or being associated with a mobile terminal or a base station.

In particular several such base stations could be organized in a collaboration area, wherein a central network component (which may be a functional entity deployed with a particular base station) organizes the collaboration area. Hence, the device mentioned may be a base station with such a central network component or even a central network component deployed as a physical entity.

The problem stated supra is further solved by a communication system comprising the device as described herein.

The approach provided proposes a collaborative antenna scheme for active interference management inside a so-called collaboration area (CA). It is in particular suggested utilizing a unified framework for feedback given by mobile terminals (MTs) for active interference management.

Receive antennas at a mobile terminal can be used jointly for data detection as well as interference suppression. Each user may apply for one data stream. However, it is also an option to support multiple data streams per user. In such case, the mobile terminals may provide multiple MISO feedback channels.

Considering the case of multiple Rx antennas per terminal, each user may independently select its preferred receive strategy (i.e. select Rx antenna(s), select MRC and/or IRC and utilize receive filter accordingly) and convey the effective MISO channel apparent behind the receive filter. The scenario of a single Rx antenna terminal corresponds to the Rx antenna selection.

Each mobile terminal then determines the channel coefficients and then reports them to the serving base station (BS). In turn the BS distributes these then among the BS within the CA. The BSs then perform a joint pre-coder calculation in a parallel manner, reducing additional exchange of pre-coder weights and minimizing delay over the connecting link between BSs. A final coordinated and joint application of these precoder weights allows suppression of intra-cell interference and coherent joint transmission of data-streams from distributed antennas.

The approach suggested applies in particular for systems using CSI-based pre-coding and/or beamforming irrespective of whether or not base station sectors are collaborating.

For example, a framework for feedback provisioning from at least one mobile terminal to at least one base station is considered. The solution provided in particular utilizes an MISO channel and each mobile terminal may select a receive strategy independently from any other mobile terminal. Such selection can be conducted based on the computational capability of the respective mobile terminal.

A multi-cell channel information may be fed back to at least one base station after receiver processing by the mobile terminal. Several base stations can be combined to a collaboration area (CA). Distributed processing can be provided by each base station thereby facilitating a real-time implementation.

Figure 1:
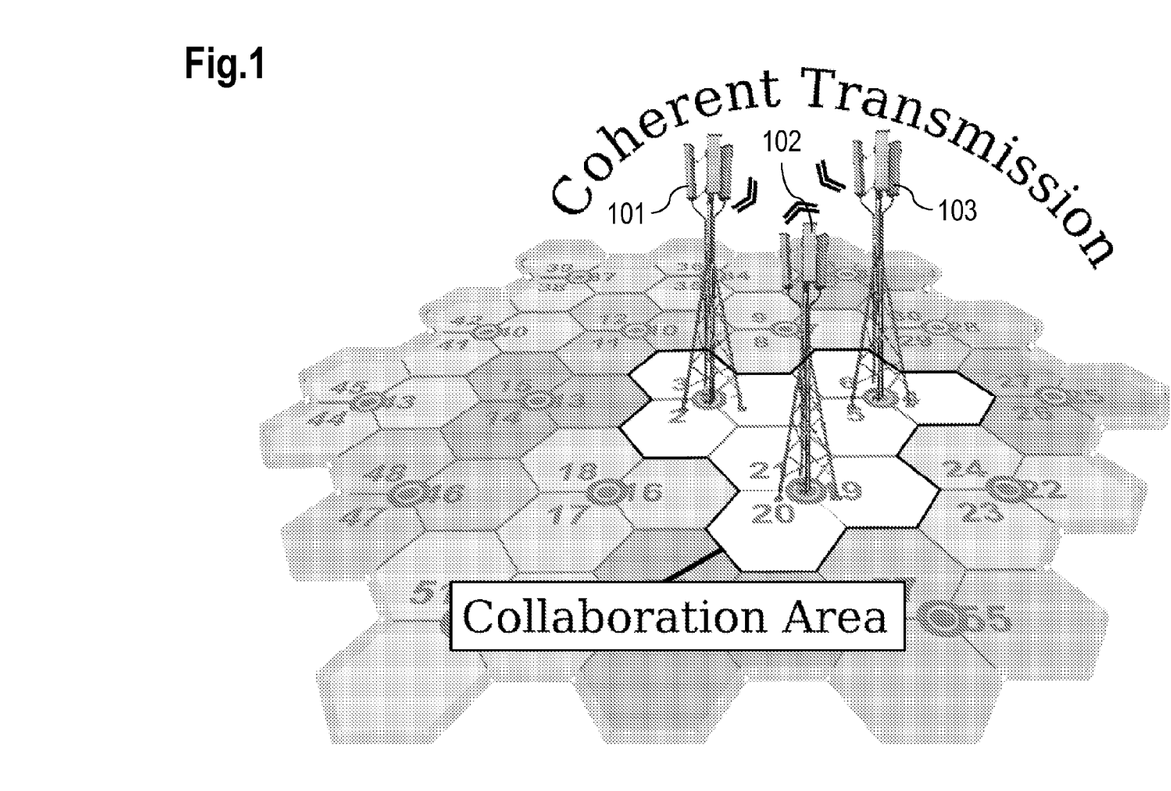
FIG. 1 shows a collaboration area comprising three base stations allowing for a coherent transmission towards associated mobile terminals.

FIG. 1 shows a collaboration area comprising three base stations 101, 102, 103 allowing for a coherent transmission towards associated mobile terminals.

Figure 2:
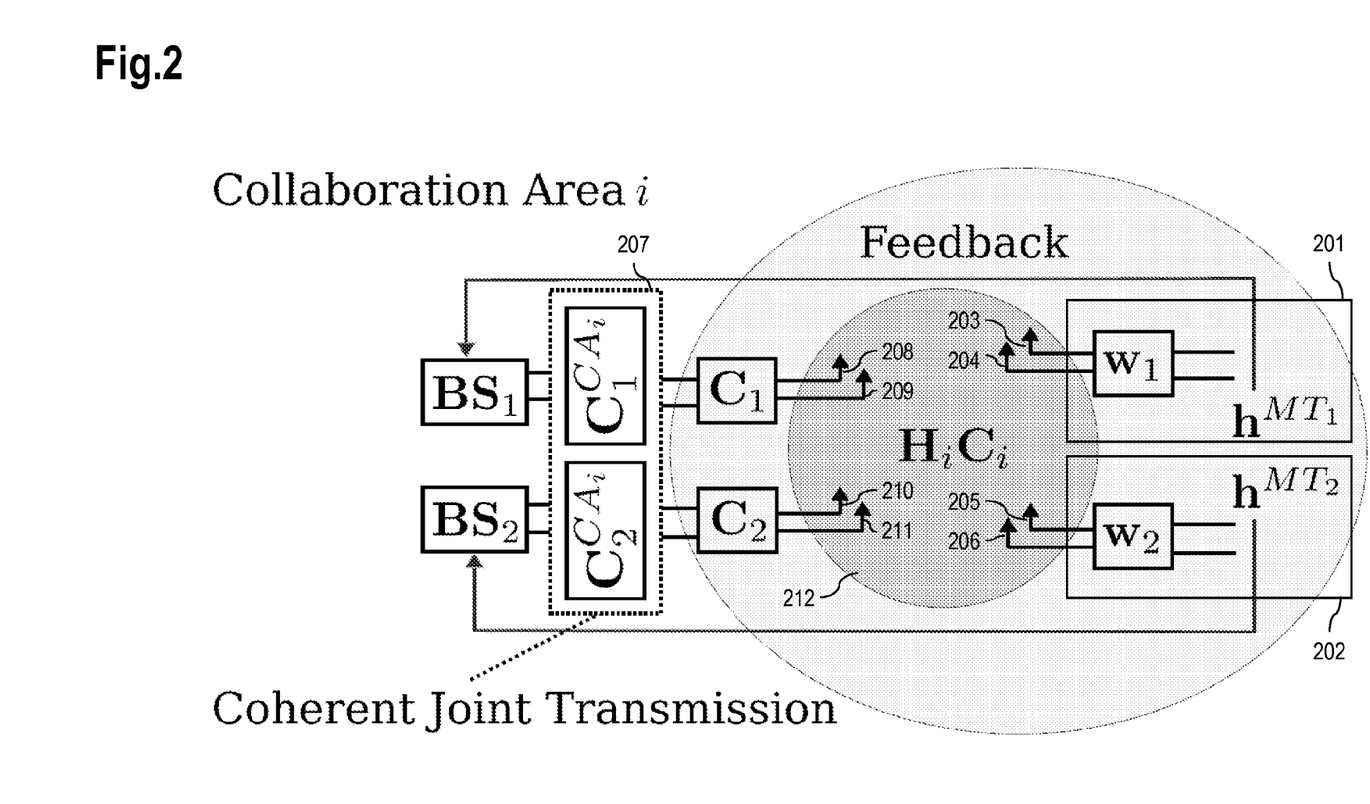
FIG. 2 depicts an schematic diagram visualizing an approach for feedback pre-selection at each of two mobile terminals.

FIG. 2 depicts an schematic diagram visualizing a method for feedback pre-selection at each mobile terminal.

A mobile terminal 201 comprises two antennas 203, 204, a receive filter $w_1$ and provides a MISO channel feedback $h^{MT_1}$ to a base station $BS_1$. Accordingly, a mobile terminal 202 comprises two antennas 205, 206, a receive filter $w_2$ and provides a MISO channel feedback $h^{MT_2}$ to a base station $BS_2$.

The base stations $BS_1$ and $BS_2$ both perform a coherent joint transmission 207 processing the whole pre-coder $C^{CA_i}$ on the given user feedback, but using the corresponding respective parts $C_1^{CA_i}$ and $C_2^{CA_i}$ for coherent joint transmission. Each base station $BS_1$ and $BS_2$ in FIG. 2 comprises two antennas 208, 209 and 210, 211 that are fed via a pre-coding matrix $C_1$, $C_2$ for each base station $BS_1$ and $BS_2$. The antennas of FIG. 2 communicate via a radio channel 212 described as $H_iC_i$ indicating a collaborative area i.

In this case each sector is allowed to use independent unitary beamformers $C_2$, $C_2$ in case of non-collaborative transmission. Thus, each MT provides feedback on its effective MISO channel, seen among several BS antennas.

It is noted that BS collaboration increases the number of antennas from the perspective of signal processing. For the case of multi-antenna MTs SDMA with a single data stream per user may be the dominant transmission mode in multi-user systems. Thus, providing feedback via a single data stream may suffice for a user and will save a significant amount of feedback overhead.

In case of single-antenna MTs, each MT may process a MISO channel and may provide feedback information about thereof to its serving BS.

In case of multi-antenna MTs, each MT may use linear receive filters to report an effective MISO to its serving base station. The effective MISO channel may be determined based on several input signals from one BS or several BSs. Each BS may provide several input signals via several antennas. Furthermore, the BSs may be of one CA, but can also be of different CAs. In particular a reference signal from a BS that is not part of the current CA can be utilized for beam forming purposes at the MT.

Figure 3:
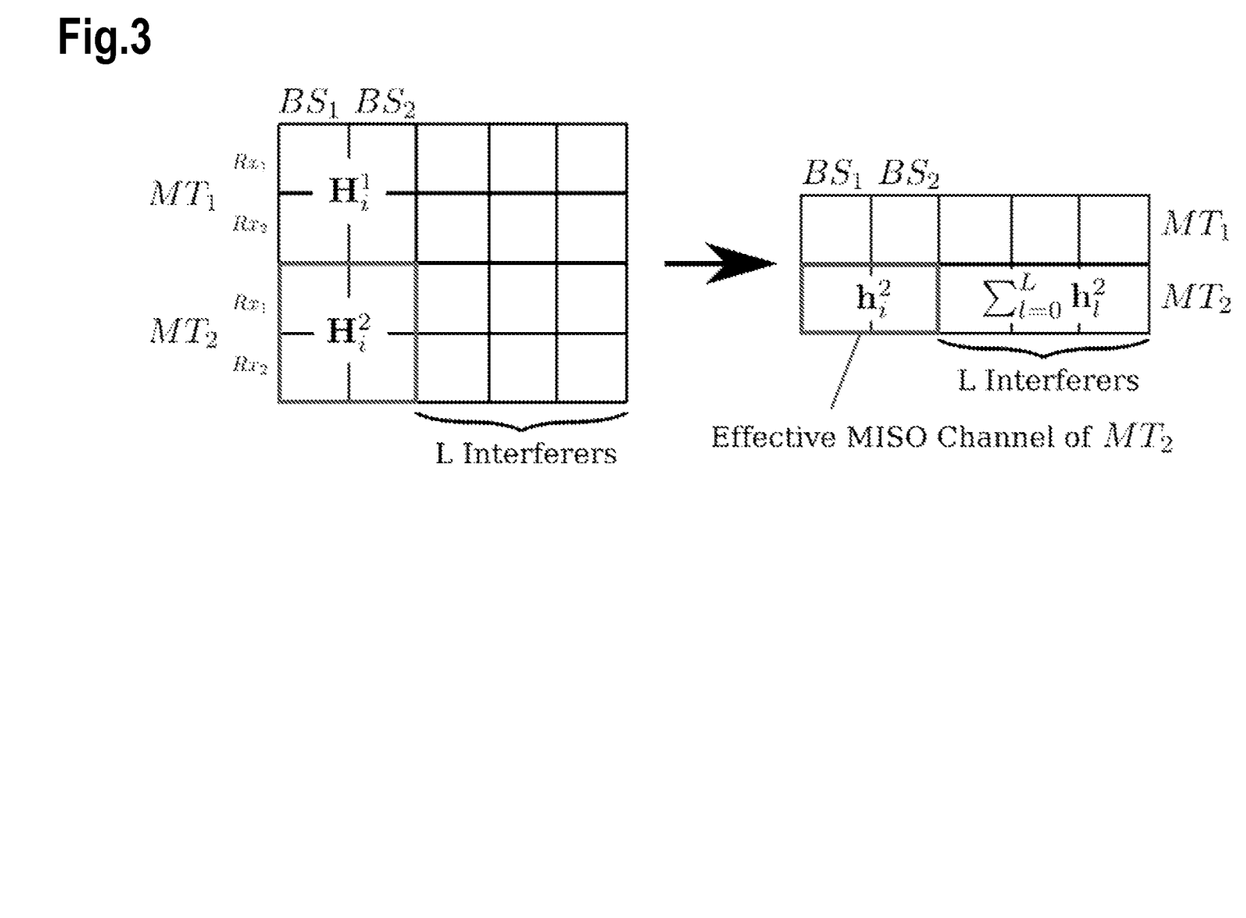
FIG. 3 shows a schematic diagram that illustrates a trans-forming of a MIMO channel into an effective MISO channel with known SINR.

FIG. 3 shows a schematic diagram that illustrates a transforming of a MIMO channel into an effective MISO channel with known SINR. Said effective MISO channel is conveyed as feedback information to the MT's serving BS. Hence, the MIMO channel $H_i^m$ received via two antennas at the respective MT m from two BSs is combined into said effective MISO channel $h_i^m$.

Therefore each MT may choose at least one of the following approaches, in particular its receive filter(s), according to its own computational capabilities:
   Simple receive antenna selection;
   Maximum Ratio Combining (MRC);
   Interference Rejection Combining (IRC), in particular comprising different degrees of interference knowledge;
   Singular value decomposition (SVD), optionally in combination with MRC and/or IRC.

Each BS in the collaborative area (CA) may use a pre-selected algorithm for user orthogonalization purposes and may be able to determine pre-coding weights in a distributed way.

The following signalization mechanisms may be utilized:
(a) The BSs may ask MTs to provide a specific type of CSI feedback, i.e. full MIMO-CSI or effective MISO-CSI.
(b) Unique identifiers can be used for distributed processing, i.e. according to an order of BS antennas.
(c) Protocols for stable joint transmission are preferably to ensure stable operation, e.g., in case of packet loss.

Further Advantages:
(a) The approach enables a unified framework for feedback and also allows for non-collaborative transmission.
(b) A distributed collaborative interference management is provided, including in particular network MIMO (cooperative multipoint transmission (COMP), joint transmission).
(c) An extent of collaboration can be selected at the BS.
(d) An amount of feedback signaling can be significantly reduced for the transmission antennas of the base station (s) as well as for the receiving antennas of the mobile terminal. For example, in case of ra=2 receive antennas by a factor of 2 and in general by a factor of ra amounting to the number of receive antennas.

Hereinafter, further details regarding the suggested concepts are described.

System Model

A downlink multiple-input multiple-output (MIMO)-OFDM transmission system for an isolated sector with $N_T$ transmit and $N_R$ receive antennas per MT can be described on a per sub-carrier basis as follows $$y = HCx + n \qquad (1)$$

where
   H is a $N_R \times N_T$ channel matrix;
   C is a unitary $N_T \times N_T$ pre-coding matrix or a matrix denoting any modulation format, in particular comprising amplitude modulation;
   x denotes a $N_T \times 1$ vector of transmit symbols;
   y, n denote $N_R \times 1$ vectors of received signals and of the additive white Gaussian noise (AWGN) samples, respectively, with a covariance amounting to $E\{nn^H\} = \sigma^2 I$.

In a downlink channel of a cellular system, frequency resources may be reused in all neighboring cells. Depending on the deployment of base station sites and depending on an actual position of the MT, the MT may receive interfering signals destined for other users in addition to its own desired signal.

At an initial step, all BSs may provide $\Omega$ fixed unitary beam sets $C_\omega$, $\omega \in \{1, \ldots, \Omega\}$.

Each beam set may comprise $\alpha N_T$ fixed pre-coding vectors (beams) $b_{\omega,u}$ with $u \in \{1, \ldots, \alpha N_T\}$, where $\alpha$ denotes a size of a collaboration area (CA). Each BS-cluster i may independently select one of these beam sets.

Each sector may use $N_T$ beams, denoted by $b_{i,u}$ as the u-th pre-coding vector used by cluster i. The received downlink signal $y^m$ at the mobile terminal m in the cellular environment may amount to $$y^m = \underbrace{H_i^m b_{i,u} x_{i,u}}_{\overline{h}_{i,u}} + \underbrace{\sum_{j=1, j \neq u}^{\alpha N_T} H_i^m b_{i,j} x_{i,j}}_{\zeta_{i,u}} + \underbrace{\sum_{\forall l, i \neq i} \sum_{j=1}^{N_T} H_l^m b_{l,j} x_{l,j}}_{z_{i,u}} + n. \qquad (2)$$

The desired data stream $x_{i,u}$ transmitted on the u-th beam from the i-th cluster is distorted by the intra-cluster and inter-cluster interference aggregated in $\zeta_{i,u}$ and $z_{i,u}$, respectively.

$H_i^m$ spans the $N_R \times \alpha N_T$ channel matrix for user m formed by the cluster i. Thus, $\zeta_{i,u}$ denotes an interference generated in the cooperation area.

The $\alpha N_T$ beams in the beam set $C_i$ may simultaneously be active, wherein an available power $p_i$ is assumed to be uniformly distributed over the $\alpha N_T$ beams.

Hence, the following applies:

$$E\{|x_{ij}|^2\} = \frac{p_i}{\alpha N_T} \text{ and}$$

$$p_i = \sum_{j=1}^{\alpha N_T} E\{|x_{i,j}|^2\} = \alpha p_s,$$

with $p_s$ being a transmit power per sector.

A chosen set of pre-coders may be kept fixed, e.g., to $$C_1 = \frac{1}{\sqrt{2}}\begin{bmatrix} 1 & 1 \\ i & -i \end{bmatrix}, \quad (3)$$

$$C_i = \underbrace{\text{diag}[C_1, \ldots, C_1]}_{\alpha\text{-times}},$$

where $C_1$ is defined for $N_T=2$ transmit antennas (Tx antennas) per sector.

A cluster of BS antennas may be grouped for joint signal pre-processing and a coherent transmission of data signals and a cooperation area (CA) may be defined. The CA may manage interference by utilizing joint signal processing prior to transmission over the wireless channel. Data signals coming from outside this CA will be treated as inter-cluster interference, where the spatial structure can be measured, e.g., by estimation of the interference co-variance matrix. CAs can be selected network-centric or user-centric. The user-centric choice can be determined, e.g., by measuring broadband channels to nearby BSs and by reporting a set of strongest BS antennas to the MT's serving BS. The serving BS may initialize the setup of a new CA or allocate this particular MT into a user group served inside a predefined CA. The overlap of CAs including different BS antenna combinations can be separated, e.g., in a frequency domain by means of resource partitioning.

For downlink cooperation among a selected set of a cooperating BS sectors, a collaborative pre-coder $C^{CA_i}$ can be modified to any kind of beamforming as shown in FIG. 2.

Each collaborating BS in the CA determines in a distributed manner the whole pre-coder $C^{CA_i}$ on the given user feedback utilizing the corresponding respective parts $C_1^{CA_i}$ and $C_2^{CA_i}$ for coherent joint transmission.

FIG. 2 shows a pre-coding for coherent joint transmission that determined in a distributed fashion by two base stations, wherein the corresponding parts thereof are provided by each of the collaborating BSs.

MT-Assisted Feedback Pre-Selection

For channel adaptive transmission to one MT or to several MTs, each MT may provide limited or full CSI to the BSs. With a limited amount of uplink resources, especially due to limited power supply at the MTs, CSI feedback overhead may advantageously be decreased saving valuable uplink resources. Therefore, a MT-assisted channel pre-processing is suggested.

Transmitting a single stream to each of the multiple MTs in the cell allocates a significant portion of the system's capacity. Hence, a multi-user MIMO (MU-MIMO) transmission mode may advantageously be utilized.

For $N_R>1$ a spatial degree of freedom at the MT's receiver side can be utilized for the purpose of interference rejection combining (IRC) according to $$SINR_u = p_i \frac{w_u^H \bar{h}_{i,u} \bar{h}_{i,u} w_u}{w_u^H Z_u w_u}, \quad (4)$$

where $Z_u$ is a covariance matrix of interfering signals aggregated in $\zeta_{i,u}$ and $z_{i,u}$, i.e.

$$Z_u = E[(\zeta_{i,u}+z_{i,u})(\zeta_{i,u}+z_{i,u})^H],$$

with $E[.]$ being an expectation operator.

An interference-aware MMSE receiver is given according to $$w_u^{MMSE} = \frac{p_i R_{yy}^{-1} \bar{h}_{i,u}}{Q_i}, \quad (5)$$

wherein $R_{yy}$ denotes the covariance matrix of the received signal $y^m$, i.e.

$$R_{yy} = E[y^m(y^m)^H] = Z_u + \bar{h}_{i,u}\bar{h}_{i,u}^H \quad (6)$$

It is noted that the MMSE receiver may be aware of interference either by having a full knowledge, i.e. spatial structure, or a partial knowledge, i.e. a power on the inter-cluster interference may be considered.

The MMSE receiver may yield a post-equalization SINR as follows:

$$SINR_u^{MMSE} = \frac{p_i}{Q_i} \bar{h}_{i,u}^H Z_u^{-1} \bar{h}_{i,u}. \quad (7)$$

All proposed schemes have in common that each MT can choose its desired receive strategy independently from any other MT according to its computational capabilities and knowledge on channel state information at the receiver (CSIR) including interference. Agreed assumptions between the MTs and the CA may be based on the fact that a minimum intra-cluster interference pre-coder is applied. The performance of different linear receivers to obtain an effective channel can be different after zero-forcing (ZF) pre-coding at the BSs.

With regard to an example providing $N_R=2$ receive antennas (RX antennas) per MT, the principle can be illustrated as follows: Each MT pre-computes an effective multiple-input-single-output (MISO) channel and reports this to the serving BS in the cooperation area. Receiving such feedback from several users in the cooperation area, the BS may use different methods for user orthogonalization, e.g., linear pre-coding as ZF, MMSE or block diagoninalization (BD) or non-linear Tomlinson-Harashima pre-coding (THP).

Feedback on True MISO Channel

For baseline systems, the MT has only a single Rx antenna and therefore reports the true MISO channel to the BS according to:

$$h^{MT_1} = \frac{[\bar{h}_{BS_1} \bar{h}_{BS_2}]}{\bar{h}_i} \quad (8)$$

where $\bar{h}_{BS1}=H_{BS_1}b_{BS_1,j}$ is a vector comprising j complex valued effective channel coefficients between Tx antennas from a first base station $BS_1$ and the single Rx antenna of the first mobile terminal $MT_1$.

According to this concept, the MISO channel $h^{MT_m}$ received at the m-th MT can be fed back to the base station in addition a SINR value.

The MT may not have any possibility to compensate inter-cluster interference, which limits the SINR. For the achievable SINR, the CA may provide the data stream to a particular $MT_m$, while all other data streams used for residual MTs are orthogonalized by use of the ZF pre-coder. Thus, the MTs in the cluster do not experience any intra-cluster interference.

$$SINR^{MT_m} = \frac{\beta^{MT_m}}{\sum_{l=1}^{L}\sum_{j=1}^{N_T}|H_l b_{i,j}|^2 + \sigma_N^2} \quad (9)$$

where
$\beta^{MT_m}$ is a transmit power scaling factor applied on the data stream send to the m-th MT;
$\sigma^2_N$ is a noise power received at the single Rx antenna.

It is noted that if no transmit power limit is applied, $\beta^{MT_1}$ equals 1. The entire path-loss is pre-compensated at the transmitter, resulting in unit signal power at the receive antenna.

Feedback on Desired Beamformer
DFT-Based Non-Cooperative Pre-Coding

It is also noted that sectors may operate independently from one another while inter-cell interference is accounted for at the multi-antenna MT.

Each BS may provide a fixed matrix C comprising unitary DFT beams. Assuming that the inter-cell interference is completely known at each MT, the MTs evaluate the achievable rate per beam and convey this information to their serving BS. At the BS, the feedback from different MTs is collected, and the DFT beams from the matrix C are assigned individually to the MT.

The MTs are assumed to provide their preferred matrix index (PMI) and the corresponding SINR.

It is an advantage that with the fixed beam set C used for the BSs, a co-channel interference (CCI) amounting to $\zeta_{i,u}+z_{i,u}$ becomes predictable, enabling an interference-aware scheduling in a cellular system. In combination with fair, interference-aware scheduling policies, users may benefit from almost doubled spectral efficiencies in the MIMO 2×2 system compared to the SISO setup.

Effective MISO Channel after Equalization

In the following, the MTs considered are equipped with multiple Rx antennas for the purpose of IRC. The BSs are assumed to provide $N_T$ data streams to $N_T$ MTs.

In this case, the MTs may use linear receive filters to transform the MIMO channel into an effective MISO channel, according to FIG. 3.

The MT may provide feedback regarding an achievable SINR and the effective MISO channel $h^{MT_m}$.

Furthermore, if true ZF pre-coding is assumed at the BSs, feedback can be split into amplitude and phase instead of I and Q samples to describe the channel. Hence, the amplitude may be of less importance and can be reduced to a mean path-loss. On the other hand, the phase information is useful to allow for an adequate ZF pre-coding.

DFT-Based Pre-Coding and MMSE Receiver

DFT-based pre-coding may be maintained, but the effective MISO channel may be fed back to the BS, which can be determined behind a linear equalizer at each MT. Thus, each MT may calculate a spatial receive vector for the best transmit stream and reports the product of receive filter according to equation (5) and the aggregated channel matrix from the cluster:

$$h^{MT_m}=[w_u^{MMSE}]^H[H_i C_i] \quad (10)$$

A linear receive filter $w_u^{MMSE}$ can be determined by assuming DFT-based pre-coding for intra-cluster and inter-cluster signals. A ZF pre-coder among the collaborative Tx antennas may remove the intra-cluster interference, while keeping the inter-cluster interference on a low level.

This approach may profit from a pre-selection of suitable resources. Further, gains from IRC are kept in the system. In addition, the MT is not required to have high computational power, e.g., to do a singular value decomposition (SVD) on the measured collaborative channel $H_i$.

Dominant Eigenmode Pre-Coder and MRC Receiver

With a fixed set M of users, which may be served in a resource block (RB), each user m decomposes its $N_R \times \alpha N_T$ channel matrix $H_i^m$ according to the a SVD, yielding $H_i^m=U\Sigma_i V_i^H$.

Each MT may apply for a single data stream only, i.e. for a single MU-MIMO service. Thus, a dominant eigenmode can be selected, i.e. the eigenvector corresponding to the highest eigenvalue. The effective channel after maximum ratio combining (MRC) equalization using the dominant left eigenvector is given by $$h^{MT_m}=u_{i,1}^H U_i\Sigma_i V_i^H=\Sigma_{i,1}v_{i,1}^H \quad (11).$$

This scheme advantageously maximizes the signal power transferred from collaborative BSs to the MT. The MTs may preferably be grouped such that their eigenmodes show a high orthogonality, in particular the highest possible orthogonality. This allows for an efficient power reduction.

Dominant Eigenmode Pre-Coding and MMSE Receiver

This solution combines the preceding two concepts, i.e. dominant eigenmode pre-coder with a MMSE equalization at the MT. Thus, a reporting based on the effective MISO channel $h^{MT_m}$ behind linear receive filter is assumed to be provided by the MT as follows:

$$h^{MT_m}=[w_u^{MMSE}]^H[H_i] \quad (12).$$

The linear receive filter is determined based on an assumption of eigenmode pre-coding for the dedicated data stream and DFT-based pre-coding for inter-cluster signals. Other data streams inside the cooperating cluster are assumed to be transmitted orthogonal in space.

$$w_u^{MMSE} = \frac{p_i}{Q_i}R_{yy}^{-1}\frac{H_i v_{i,1}}{\bar{h}_{i,u}}. \quad (13)$$

The initial spatial channel assumption concentrates on outside interference as the limiting interference contribution, while the effective MISO channel inside the cooperation area is chosen such that the desired signal from the set of BSs to the MT is maximized.

The final SINR can thus be fully pre-computed at the BS, since the initial SINR reported from the MT under ideal pre-coding using the dominant eigenbeam forming (DEBF) will be altered by the power normalization per transmission stream only.

Implementation Issues: Effective Channel Estimation

Single-cell transmission may be based on fixed pre-coding matrices $C_i=C_w$, where i identifies the base station.

To enable IRC at the MT, the true multi-cell channel $H_i$ from (all) BSs to a given terminal m may be estimated. Pre-coding matrices may not change frequently in order to keep multi-cell interference predictable. Hence, a first channel estimation based on multi-cell pilot symbols is required at this step to determine $H_iC_i$.

In order to estimate the effective MISO channel at the output of each linear receive filter, $h^{MT_m}$ may be determined as set forth above. Also, pilot symbols may be processed like data by the receive filter. Hence, the effective MISO channel can directly be estimated on such a common reference signal.

Cooperative and Distributed Pre-Coder Calculation

As in particular discussed above, reporting a virtual MISO channel is of advantage and can be orthogonalized by the collaborative BSs like a single antenna receiver. Once MTs are grouped and assigned to a CA, the pre-coder and its power normalization are determined by the used algorithm, which may preferably be the same on all distributed processing units. It may be of advantage in case the same software and/or hardware is utilized on all processing units of a CA.

Joint Pre-Coder Weight Calculation

Each MT in the active set of users on a single data stream may be served while the Rx antennas are used for IRC purposes.

A maximum number of $\alpha N_T$ MISO channels experienced from different MTs are composed to form a compound virtual MIMO channel of a size $N_T \times N_T$. A compound channel matrix can be orthogonalized by any linear or non-linear pre-coding technique, if a full rank is assured. This may be the case in a multi-point to multi-point channel. The proposed approach allows to benefit from two major advantages: First, the multiple receive antennas are efficiently used for suppression of external interference at the MT's side. Second, by reducing the number of data streams per MT, the degrees of freedom in multi-user grouping can be utilized such that the number of all active data streams is smaller than or equal to the number of active transmit antennas.

Unique Identifiers for Distributed Processing

After the BS has received the multi-casted CSI from the other BSs of the CA, a cross-check of all contents, in particular regarding the origin (MT and BS identifier) and a time stamp (frame number and optionally sub-frame number) is conducted. Next, all valid CSI data can be loaded in a pre-determined order, assuring that the compound channel matrices put together at different BSs are identical in each entry. This can be assured per sub-carrier or per physical RB in OFDM systems where transmit collaboration is applied.

The pre-determined order can be achieved by numbering all active BS Tx antennas within the CA while keeping track of the corresponding MT identifier. This antenna numbering is advantageously known to all MTs.

In case the compound channel matrix is available and valid, all processing units can use the same deterministic algorithms to determine the joint pre-coder $C^{CA_i}$.

CA Protocols for Stable Joint Transmission

As a final hand-shake before calculating the joint pre-coding matrix $C^{CA_i}$, the (in particular all) BSs distribute via multi-cast a correctly received CSI message to the (in particular to all) BSs of the CA.

If one BS has incomplete data, e.g., due to packet loss, other BSs within the CA can provide the missing pre-coder weights and the calculation of the post-detected SINR. This ensures that joint spatial pre-processing can still successfully be performed.

It is noted that several protocols, e.g., master-slave or central controller approaches, can be utilized, but may inflict additional traffic and latency on the X2 interface for pre-coder and modulation and coding scheme (MCS) level exchange. This allows for data consistency at all distributed points, which is an important issue whenever a distributed approach is considered.

Meeting the Transmit Power Constraint

The rationale of stringent transmit power constraints per transmit antenna and per site is based on operating the power amplifier at the BS at an optimum operation point with respect to a high Peak-to-Average-Power-Ratio of the OFDM time domain signal and keeping the emitted power spectral density flat, which is favorable for reliable broadband channel measurements and for spectrally balanced interference to other cells.

In order to meet the requirements of a fixed maximum transmit power per Tx antenna, the pre-coder matrix is column-wise normalized such that the average transmitted power per data stream is (substantially) constant. On the average and considering slightly different phases and amplitudes over the entire frequency range of the OFDM symbol, a rather constant transmit power per Tx antenna can be reached as well. Since the normalization for all elements of one and the same precoder column is the same, the resulting SNRs post-detected per data stream can be normalized differently.

Selecting the Right Matrix Row for Coordinated Local Spatial Pre-Coding

According to the pre-determined order of the BS antennas, each BS knows which row out of the finally calculated joint pre-coder matrix belongs to its own transmit antennas. This particular row is selected and stored for further processing together with the user data which are expected for each user to arrive via multi-cast messaging on the X2 interface.

The time stamp allows for a synchronization of pre-coder and data content, which is beneficial for successful coherent transmission of data and active interference management within the CA.

Determination of Post-Detector SINR

In addition to CSI per sub-carrier or per resource block (RB), each MT reports the effective post-equalization SINR. The final SINR can be determined or predicted after ZF pre-coding applying the pre-chosen receive filter per MT.

The normalization factors $\beta_{MT_m}$ for the m-th column of the spatial pre-coder and therefore for the data stream to the m-th MT can be calculated and multiplied with the reported SINR per MT.

The calculation of the final post-detection SINR considering joint transmit pre-coding and the reported effective SINR from each MT can again be calculated in a distributed fashion by the serving BS of each MT. This BS is in charge of the current and future continuation of higher layer protocols, such as HARQ. After having decided the final effective post-detect SINR to be expected at the MT for the allocated stream, a MCS level, a puncturing and a PDU size can be chosen such that each spatial layer is utilized for data trans-mission purposes.

It is noted that puncturing is a method that allows reducing a forward error correction code for a first transmission. In case the first transmission is successful, the overhead portion based on such forward error correction code can be reduced thereby increasing the bandwidth to be utilized for user data. In case the first transmission with such reduced amount of forward error correction code is not successful, additional redundancy information is conveyed in a second transmission. Such shortening of the redundancy information (here: the forward error correction code) in the first trans-mission is referred to as "puncturing". The whole method can be referred to as hybrid ARQ.

The chosen MCS level for each spatial layer is tagged to an associated encoded data stream and is again multi-casted to each BS belonging to the active set of antennas in the CA, which will perform mapping onto higher modulation formats locally and the mapping to the correct spatial pre-coder input queue.

The MTs may in parallel be informed about the allocated resources and the MCS levels. Since resource allocation announcement is in charge of the serving BS for each MT, this can either be done in a cooperative transmit mode or in a non-cooperative mode per BS.

Zero-Forcing (ZF)

Having established CAs and having found a suitable user group, the joint MIMO channel between the BS and the MT antennas can be treated as a standard point-to-multi-point MIMO channel.

Thus, the spatial signal separation is performed at the BS antennas based on the known CSI. By exploiting this channel, adaptive spatial pre-coding the interference inside the CA can be reduced and—in a best-case scenario—an intra-cluster interference-free transmission may be achieved.

Since collaborative signal processing across the network is most likely not feasible (in case of a huge network), it may be a solution to focus on a size for the CA to comprise 3 to 4 BS sectors. The residual inter-cluster interference may limit the performance of the CA. Thus, it can be focused on a joint SINR maximization including the spatial structure of the inter-cluster interference.

To mitigate intra-cluster interference spatial ZF pre-coding can be considered, which is adapted to the joint channel H by choosing the pre-coder according to the Moor-Penrose pseudo-inverse of the channel $$C^{CA_i}=H_i^{\dagger}=H_i^H(H_iH_i^H)^{-1}.$$

This eliminates the inter-cluster interference.

$$y=H_iC^{CA_i}x+n=H_iH_i^{\dagger}x+n=x+n \quad (14),$$

which is equivalent to parallel AWGN transmission of data streams to different MTs.

Block-Diagonalization (BD)

To obtain the pre-coding vector for the m-th user, each BS in the CA aggregates the interfering MISO channels $$h^{MT_n} \text{ with } n \in \{1, \ldots, (m-1), (m+1), \ldots, \alpha N_T\},$$

according to the BD approach. This results in a matrix of a dimension $(\alpha N_T-1) \times \alpha N_T$ $$\tilde{h}^{MT_m}=[(h^{MT_1})^H \ldots (h^{MT_{m-1}})^H(h^{MT_{m+1}})^H \ldots (h^{MT\alpha N_T})^H]^H \quad (15).$$

Performing the singular value decomposition (SVD) of $\tilde{h}^{MT_m}$ results in $$\tilde{h}^{MT_m}=\tilde{U}_m[\tilde{\Sigma}_m 0][\tilde{V}_m^1 \tilde{v}_m^0]^H \quad (16),$$

where $\tilde{v}_m^0$ corresponds to the eigenvector associated with the null space of $\tilde{h}^{MT_m}$.

It is noted that the null space can be represented by a matrix of a dimension $\lambda \times \alpha N_T$. In case each user is served on its dominant eigenmode only, i.e. $\lambda=1$, $\tilde{v}_m^0$ is of dimension $1 \times \alpha N_T$ and thus a vector.

LIST OF ABBREVIATIONS

3G-LTE 3G Long Term Evolution
3GPP 3rd generation partnership project
ACK acknowledgement
ARQ automatic repeat request
AWGN additive white Gaussian noise
BC broadcast channel
BD block diagonalization
BER bit error rate
BS base station
CA collaboration area
CCI co-channel interference
CDMA code-division multiple access
CoMP cooperative multipoint transmission
CSI channel state information
CSIR channel state information at the receiver
DEBF dominant eigenbeam forming
DFT discrete Fourier transform
FDD frequency division duplex
FDMA frequency-division multiple access
FEC forward error correction
FSK frequency shift keying
HARQ hybrid automatic repeat request
IR incremental redundancy
IRC interference rejection combining
JT joint transmission
MAC layer, medium access control layer
MCS modulation and coding scheme
MIMO multiple-input multiple-output
MISO multiple-input single-output
MMSE minimum mean square error
MRC maximum ratio combining
MS multi-stream
MSE mean square error
MSHARQ MIMO single HARQ
MT mobile terminal
MU-MIMO multi-user MIMO
MU-MUX multi-user spatial multiplexing
MU-SDMA multi-user space-division multiple access
NACK not acknowledgement
OFDM orthogonal frequency division multiplexing
OFDMA orthogonal frequency division multiple access
PDF probability density function
PDU protocol data unit
PHY PHY layer, physical layer
PMI preferred matrix index
QAM quadrature amplitude modulation
RB resource block
Rx receiver
SDIV spatial diversity
SDMA space-division multiple access
SIMO single-input multiple-output
SINR signal to interference and noise ratio
SIR signal to interference ratio
SISO single-input single-output
SMUX spatial multiplexing
SNR signal to noise ratio
SU-MIMO single-user MIMO
SU-MUX single-user spatial multiplexing
SVD singular value decomposition
TDD time division duplex
TDMA time division multiple access
THP Tomlinson-Harashima pre-coding
Tx transmitter
UE user equipment
UMTS Universal Mobile Telecommunications System WiMAX Worldwide Interoperability for Microwave Access
ZF zero forcing

The invention claimed is:

1. A method comprising:
receiving several input signals by a mobile terminal comprising several antennas from at least one base station in a communication network comprising multiple base stations organized as a collaboration area in particular providing a coherent transmission;
selecting a preferred receive strategy independently of other mobile terminals in the communication network; and
processing said several input signals into a feedback information that is conveyed to the mobile terminal's serving base station in the collaboration area,
wherein the feedback information is conveyed via an effective multiple-input single-output channel,
wherein the base stations of a collaboration area provide distributed processing,
wherein the serving base station distributes via a multi-cast the feedback information among the base stations of the collaboration area,
wherein each of the base stations of the collaboration area conducts a cross-check of all contents of the received feedback information regarding an origin of the feedback information and a time stamp of the feedback information and loads all valid received feedback data in a pre-determined order,
wherein each of the base stations of the collaboration area performs a joint pre-coder calculation in a parallel manner,
wherein each base station of the collaboration area, prior to performing the joint pre-coder calculation, distributes via a multi-cast a correctly received feedback message to all base stations of the collaboration area, and
wherein each collaborating base station in the collaboration area determines in a distributed manner the whole pre-coder for the collaboration area on the given user feedback utilizing the corresponding respective parts for coherent joint transmission.

2. The method according to claim 1, wherein the several antennas comprise utilizing at least one antenna for interference suppression purposes.

3. The method according to claim 1,
wherein the serving base station distributes the feedback information to either at least one further base station or to a central unit or to both,
wherein the serving base station and either the at least one further base station or the central unit or both are aware of the feedback information perform a pre-coder calculation.

4. The method according to claim 1, wherein the feedback information comprises at least one of the following:
a virtual pre-coding conducted by the mobile terminal;
at least one effective radio channel.

5. The method according to claim 1, wherein the at least one base station has several antennas.

6. The method according to claim 1, wherein the input signal is a reference signal conveyed via several antennas of the at least one base station.

7. The method according to claim 1, wherein the at least one base station conducts pre-coding, beamforming, or both based on the feedback information obtained by the mobile terminal.

8. The method according to claim 1, wherein the at least one base station conveys a first type of input signals with a first amount of information less often than a second type of input signals with a second amount of information, wherein said second amount of information is smaller than said first amount of information.

9. The method according to claim 1, wherein the feedback information comprises a first type of feedback information with a first amount of information conveyed less often than a second type of feedback information with a second amount of information conveyed, wherein said second amount of information is smaller than said first amount of information.

10. The method according to claim 1, wherein the input signals from the at least one base station are orthogonal to one another.

11. The method according to claim 1, wherein the mobile terminal provides the feedback information via a multiple-input single-output channel processing, wherein the mobile terminal in particular selects a receive strategy.

12. A computer program product embodied on a non-transitory computer-readable medium, in which a computer program is stored which, when being executed by a computer, is configured to provide instructions to control or carry out the method according to claim 1.

13. An apparatus comprising:
at least one processor;
at least one memory including computer program code,
the at least one memory and the computer code configured, with the at least one processor, to cause the apparatus to perform at least the following:
receiving several input signals by a mobile terminal comprising several antennas from at least one base station in a communication network comprising multiple base stations organized as a collaboration area in particular providing a coherent transmission;
selecting a preferred receive strategy independently of other mobile terminals in the communication network; and
processing said several input signals into a feedback information that is conveyed to the mobile terminal's serving base station in the collaboration area,
wherein the feedback information is conveyed via an effective multiple-input single-output channel,
wherein the base stations of a collaboration area provide distributed processing,
wherein the serving base station distributes via a multi-cast the feedback information among the base stations of the collaboration area,
wherein each of the base stations of the collaboration area conducts a cross-check of all contents of the received feedback information regarding an origin of the feedback information and a time stamp of the feedback information and loads all valid received feedback data in a pre-determined order,
wherein each of the base stations of the collaboration area performs a joint pre-coder calculation in a parallel manner,
wherein each base station of the collaboration area, prior to performing the joint pre-coder calculation, distributes via a multi-cast a correctly received feedback message to all base stations of the collaboration area, and
wherein each collaborating base station in the collaboration area determines in a distributed manner the whole pre-coder for the collaboration area on the given user feedback utilizing the corresponding respective parts for coherent joint transmission.

14. The apparatus according to claim 13,
wherein the serving base station distributes the feedback information to either at least one further base station or to a central unit or both,
wherein the serving base station and either the at least one further base station or the central unit or both are aware of the feedback information perform a pre-coder calculation.

15. The apparatus according to claim 13, wherein the feedback information comprises at least one of the following:
a virtual pre-coding conducted by the mobile terminal;
at least one effective radio channel.

16. A method comprising:
receiving, by a receiver of a mobile terminal, a wireless signal from at least one base station in a communication network comprising multiple base stations organized as a collaboration area in particular providing a coherent transmission;
processing, by the mobile terminal, the signal to select an effective channel receive strategy,
wherein the processing is based on computational capability of the mobile terminal and knowledge of channel state information at the receiver (CSIR) including interference,
wherein the processing is done independently of any other mobile terminal; and
transmitting said effective channel receive strategy as feedback information to the source of the wireless signal,
wherein the feedback information is conveyed via an effective multiple-input single-output channel,
wherein the base stations of a collaboration area provide distributed processing,
wherein the serving base station distributes via a multi-cast the feedback information among the base stations of the collaboration area,
wherein each of the base stations of the collaboration area conducts a cross-check of all contents of the received feedback information regarding an origin of the feedback information and a time stamp of the feedback information and loads all valid received feedback data in a pre-determined order,
wherein each of the base stations of the collaboration area performs a joint pre-coder calculation in a parallel manner,
wherein each base station of the collaboration area, prior to performing the joint pre-coder calculation, distributes via a multi-cast a correctly received feedback message to all base stations of the collaboration area, and
wherein each collaborating base station in the collaboration area determines in a distributed manner the whole pre-coder for the collaboration area on the given user feedback utilizing the corresponding respective parts for coherent joint transmission.

* * * * *

UNITED STATES PATENT AND TRADEMARK OFFICE
CERTIFICATE OF CORRECTION

PATENT NO. : 9,800,297 B2  
APPLICATION NO. : 13/264259  
DATED : October 24, 2017  
INVENTOR(S) : Thiele et al.

Page 1 of 1

It is certified that error appears in the above-identified patent and that said Letters Patent is hereby corrected as shown below:

On the Title Page

Item (73), Assignee:
"Nokia Siemens Networks Oy" should be changed to -- Nokia Siemens Networks Oy and Fraunhofer-Gesellschaft zur Forderung der Angewandten Forschung E.V. --.

Signed and Sealed this
Fourteenth Day of April, 2020

Andrei Iancu
*Director of the United States Patent and Trademark Office*